United States Patent
Hönickl

(10) Patent No.: US 6,736,029 B2
(45) Date of Patent: May 18, 2004

(54) PROCESS FOR PRODUCING SUPPLY STOCK AND SUPPLY STOCK FOR SAW BLADES OR SAW BELTS

(75) Inventor: Gerald Hönickl, Weyer (AT)

(73) Assignee: Bohlrer Ybbstal Band GmbH & Co. KG, Bohlerwerk (AT)

( * ) Notice: Subject to any disclaimer, the term of this patent is extended or adjusted under 35 U.S.C. 154(b) by 32 days.

(21) Appl. No.: 09/897,448

(22) Filed: Jul. 3, 2001

(65) Prior Publication Data

US 2002/0017166 A1 Feb. 14, 2002

(30) Foreign Application Priority Data

Jul. 5, 2000 (AT) .............................. 1155/00

(51) Int. Cl.$^7$ .............................................. B23D 63/00
(52) U.S. Cl. ....................................................... 76/112
(58) Field of Search ............................. 76/112; 30/350; 83/835

(56) References Cited

U.S. PATENT DOCUMENTS 4,625,594 A  12/1986  Janke .......................... 76/112
6,363,827 B1 *  4/2002  Osing et al. .................. 83/835

FOREIGN PATENT DOCUMENTS

| DE | 75206 | 8/1970 |
| DE | 3433279 | 9/1984 |
| EP | 453436 | 10/1991 |

* cited by examiner

Primary Examiner—Douglas D. Watts
(74) Attorney, Agent, or Firm—Greenblum & Bernstein, P.L.C.

(57) ABSTRACT

Supply stock and process for producing the supply stock for a saw member that comprises at least a carrier part made of one material and at least a blade part made from a different material. The process comprises welding the carrier part to the blade part to form the supply stock having a thickness defined by a first and a second surface, forming a welding bead in an area where the carrier part is welded to the blade part, the welding bead having a projecting portion which projects beyond at least one of the first and the second surface, and removing material from at least a portion of at least one of the first and the second surface.

28 Claims, 2 Drawing Sheets

PROCESS FOR PRODUCING SUPPLY STOCK AND SUPPLY STOCK FOR SAW BLADES OR SAW BELTS

CROSS-REFERENCE TO RELATED APPLICATIONS

The present application claims priority under 35 U.S.C. §119 of Austrian Application No. 1155/2000 filed on Jul. 5, 2000.

BACKGROUND OF THE INVENTION

1. Field of the Invention

The invention relates to a process for producing supply stock for saw blades or saw belts with a carrier part and a blade part made from different materials becoming metallically bonded to one another by welding, and with the thickness of the bonded or bi-metal part being adjusted or set and the supply stock being formed.

Additionally, the invention includes supply stock for the production of saw blades or saw belts comprising a carrier part and at least one cutting part, which parts are metallically bonded to one another by welding, forming a bi-metal or tri-metal bonded part, and with the supply stock being adjusted in its thickness.

2. Discussion of Background Information

Due to different wear during use, on the one hand, saw blades or saw belts must be able to compensate high bending, tensile, and transverse strain in the blade part or carrier part and, on the other hand, must be provided with high stability of shape of the cutting edges and/or high abrasion resistance and/or wear resistance of the edge tips.

It is known to produce saw blades or saw belts from a supply stock comprising different material parts, i.e., a carrier part and/or carrier belt made from a tenacious material and a blade part made from a material that can achieve high hardness and high wear resistance by means of thermal hardening. For producing such a so-called bi-metal or tri-metal belt, a carrier belt and at least one cutting material belt are bonded to one another without any additional material, in most cases using laser welding or electron-beam welding.

However, the weld joint of the material parts can represent a problematic zone with respect to production technology and metallurgy. On the one hand, a complete welding of the narrow sides of the belts is to be achieved; on the other hand, undesired bulging of the weld seam and/or the formation of a disturbing, raised welding bead is to be avoided. Additionally, the welding bead and/or the bond region formed during welding are provided with lower tenacity and high stability of the material regarding changes in shape.

In order to avoid weld joint bulges to a large extent, welding technologies have been optimized for that purpose; however, during the complete welding of the narrow sides of the belts, the formation of a convexly protruding welding bead can occur at least on one side.

It is common in the prior art, subsequent to the welding of the carrier part to the blade part, to mill and/or adjust the bonded belt with respect to thickness, which is called dressing by one skilled in the art, thus producing a supply stock for the production of saws not containing any convex or protruding regions on the lateral surfaces. These lateral surfaces are called belt surfaces. However, this measure, though counteracting increased friction between the saw blade and the material to be sawed, has the disadvantage that, on the belt surfaces, the protruding regions of the welding beads are pressed into the supply stock/belt cross section with an increased deformation. Thus, tapering of the material on both sides of the milled volume areas in the belt can occur and longitudinal grooves can be present on both sides of the deformed welding bead in the belt.

However, these longitudinal groves in the bond region of the two material parts have the disadvantage that, subsequent to the forming of the tooth spaces, the grooves in the tooth region can cause increased tension in the base of the notch, thus presenting the danger of tears arising that may cause the fracture of tooth tips during practical operation of the saw or a shortening of the life of the saw.

SUMMARY OF THE INVENTION

With respect to improving the quality of the supply stock and, ultimately, achieving a high saw quality, an object of the invention is to avoid longitudinal grooves in the bond region of the two material parts of the and/or at the supply stock and to restrain the danger of tears arising from grooves in the longitudinal direction of the belt in the bond region of the material parts.

The invention therefore provides for a process of the type mentioned at the outset in that, subsequently to welding the parts, at least one side of the surface of the bonded part is worked in a cutting fashion at least locally in the region of the connection and the bulging of the welding seam and/or welding bead is removed.

The advantages achieved with the invention can essentially be seen in the fact that, in spite of an adjustment of the plane parallelism of the belt, the build-up of mechanical stresses in the same can be minimized, in particular, can be prevented. Therefore, no increased local material tensions caused by the milling of bulging in the welding region are present between the carrier material and the cutting part, which provides improved use characteristics with an extended life span for a saw made from the supply stock.

Particular advantages regarding the quality of the bond of the parts and regarding the quality of the saw ultimately made from the supply stock is achieved when the weld joint bulging is removed by grinding, in particular polishing.

However, it may be important and advantageous here for the cutting or the polishing of the bonded part to occur in a direction for removal of the material which is perpendicular or diagonal to the longitudinal direction of the bonded part, and for the tool and the bonded part to be moved relative to one another in the longitudinal direction.

The quality of the belt surfaces of the supply stock for a saw made from this material can be improved and the friction between the saw blade and the material to be sawed can be reduced in an advantageous manner when subsequent to the cutting of the bonded part, a post milling occurs for the purpose of adjusting or setting the thickness of the supply stock for saws.

The further object of the invention is achieved by the appropriate supply stock for the production of saw blades or saw belts in that, at least in the bonded region of the carrier part and the cutting part, the surfaces of the supply stock belt are formed without longitudinal ridges. The advantages thus achieved must be considered essentially in that no temperature peaks in the material can occur near the surface during thermal hardening of the saw blade, caused by ridges. Additionally, no tearing initiation points are present so that during the use of the saw the danger of tooth tips fracturing is low.

The initiation of tears originating from grooves and the breaking off of the tips of cutting parts caused thereby can be avoided to a large extent when at least one side of the surface of the supply stock is provided with a grinding structure or grinding grooves, at least in the bonded region of the parts, which are perpendicular or diagonal to the longitudinal direction of the supply stock.

Particularly high requirements for the quality of the supply stock can be achieved when additionally, as can be advantageously provided, the supply stock is finally provided with a surface adjustment and/or thickness setting by means of post milling.

The invention provides for a process for producing supply stock for a saw member that comprises at least a carrier part made of one material and at least a blade part made from a different material. The process comprises welding the carrier part to the blade part to form the supply stock having a thickness defined by a first and a second surface, forming a welding bead in an area where the carrier part is welded to the blade part, the welding bead having a projecting portion which projects beyond at least one of the first and the second surface, and removing material from at least a portion of at least one of the first and the second surface.

The removing may reduce the thickness of at least a portion of the supply stock and removes material from the projecting portion. The saw member may comprise one of a saw blade and a saw belt. The forming may comprise producing the welding bead so that a portion projects beyond each of the first and the second surface. The removing may comprise removing material from at least a portion of each of the first and the second surface. The removing may comprise removing material from at least a portion of each of the first and the second surface. The removing may comprise removing material from each of the first and the second surface of the supply stock. The removing may comprise grinding. The removing may comprise grinding and polishing. The removing may comprise removing material in a direction which is not parallel to a direction of the welding bead. The removing may comprise removing material in a direction which is at least one of diagonal and perpendicular to the direction of the welding bead.

The invention also provides for a supply stock for a saw member comprising at least a carrier part made of one material and at least a blade part made from a different material. The carrier part is connected to the blade part by welding to form the supply stock. The supply stock has a thickness defined by a first and a second surface. A welding bead is located in an area where the carrier part is welded to the blade part. The welding bead has a projecting portion which projects beyond at least one of the first and the second surface. At least one of the first surface, the second surface, and the projecting portion comprises a surface which has been subjected to material removal by cutting.

The thickness of the supply stock may be less than a thickness of at least one of the carrier part and the blade part. The saw member may comprise one of a saw blade and a saw belt. The welding bead may comprise projecting portions which project beyond each of the first and the second surface. Each of the first surface, the second surface, and the projecting portions may comprise a surface which has been subjected to material removal by cutting. Each of the first surface and the second surface may comprise a grooveless flat surface which has been subjected to material removal by cutting.

The invention further provides for a process for producing supply stock for a saw member that comprises at least a carrier part made of one material and at least a blade part made from a different material. The process comprises welding the carrier part to the blade part to form the supply stock having a thickness defined by a first and a second surface, forming a welding bead in an area where the carrier part is welded to the blade part, the welding bead having a first projecting portion which projects beyond the first surface and a second projecting portion which projects beyond the second surface, and removing material from at least one of the first projecting portion and the first surface, and the second projecting portion and the second surface. The removing reduces the thickness of the supply stock.

The saw member may comprise one of a saw blade and a saw belt. The removing may comprise removing material from each of the first and the second surface. The removing may comprise one of grinding and grinding and polishing. The removing may comprises removing material in a direction which is not parallel to a direction of the welding bead. The removing may comprise removing material in a direction which is at least one of diagonal and perpendicular to the direction of the welding bead.

The invention additionally provides for a supply stock for a saw member that comprises at least a carrier part made of one material and at least a blade part made from a different material wherein the supply stock made by a process comprising welding the carrier part to the blade part to form the supply stock having a thickness defined by a first and a second surface, forming a welding bead in an area where the carrier part is welded to the blade part, the welding bead having a first projecting portion which projects beyond the first surface and a second projecting portion which projects beyond the second surface, and removing material from at least one of the first projecting portion and the first surface, and the second projecting portion and the second surface. The removing reduces the thickness of the supply stock.

BRIEF DESCRIPTION OF THE DRAWINGS

The invention is explained in greater detail using the drawings wherein.

DETAILED DESCRIPTION OF THE INVENTION

Figure 1:
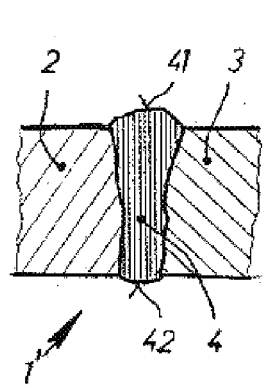
FIG. 1 shows a bonded part schematically in cross section relating to the production of supply stock for saw belts according to the prior art.

In FIG. 1, a bonded part or bi-metal part 1' is shown schematically. This bonded part 1' comprises a carrier belt 2 metallically bonded with a blade belt 3 by way of a weld bond 4. The weld bond 4 has bulges 41, 42 of the weld seam on the belt surface, which were formed during welding.

Figure 2:
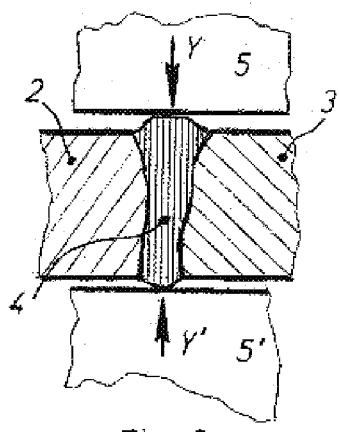
FIG. 2 shows the milling or adjusting of the bonded materials according to the prior art.

FIG. 2 shows a weld bond 4, depicted essentially like in FIG. 1, being deformed by the impact of force y, y' from the rolls 5, 5'. Due to such deformation of the weld seam, called dressing of the bonded part by one skilled in the art, an adjustment to an even thickness of the carrier belt 2, the blade belt 3, and the weld bond 4 occurs as necessary for the supply stock for the production of saws.

Figure 3:
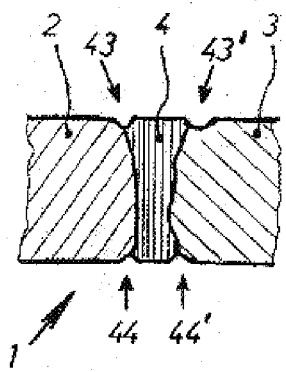
FIG. 3 shows a supply stock according to the prior art.

FIG. 3 shows a supply stock 1 subsequent to being leveled by rolls. A weld seam 4 has the same thickness as the carrier belt 2 and a blade part 3. By deforming and/or milling of bulges shown in FIG. 1 and FIG. 2 for achieving an even belt thickness longitudinal grooves 43, 43', 44, 44' and material stress develop in the bonded region. Preferably, longitudinal grooves 43, 43', 44, 44' form due to transverse stress in the material next to the weld bond. Additionally, milling of bulges 41, 42 lead to mass displacement and the formation of inner stress in the material. Both can lead to a weakening of the bond between the carrier part 2 and the blade part 3 during the production of saws from such supply stock.

Figure 4:
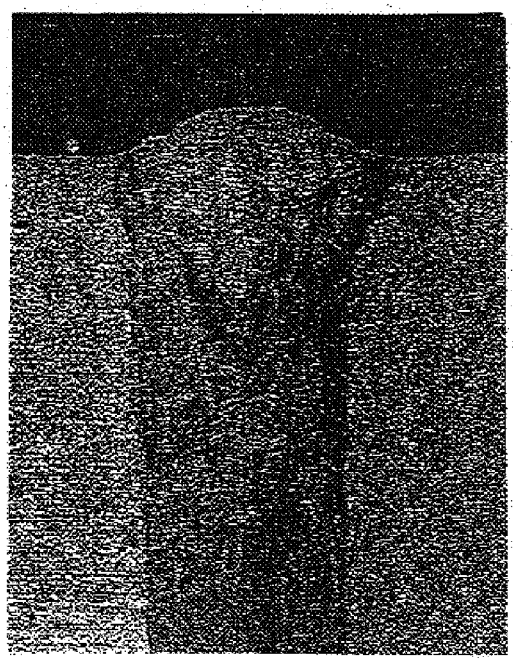
FIG. 4 shows an etching pattern of a microsection of a weld joint made according to the invention and having an enlargement of 110:1.

FIG. 4 shows the microsection of a weld bond perpendicular to the longitudinal direction of the bonded part with an enlargement of 110:1. The bulging of the welding bead above the surfaces of the carrier belt and the blade belt is clearly discernible.

Figure 5:
FIG. 5 shows the welding bead of FIG. 4 that is partially milled and is shown in enlargement of 110:1.

In FIG. 5, a milled bulge is discernible in the microsection, with longitudinal grooves being formed on both of its sides.

Figure 6:
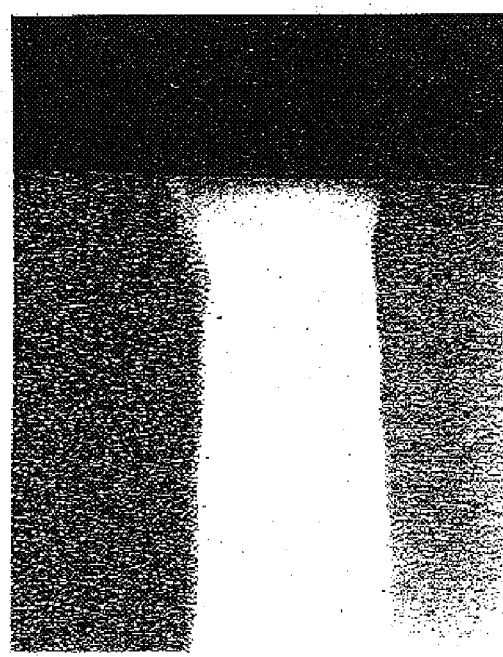
FIG. 6 shows one example of a supply stock with the welding bead removed by cutting and is shown in enlargement of 110:1.
Figure 7:
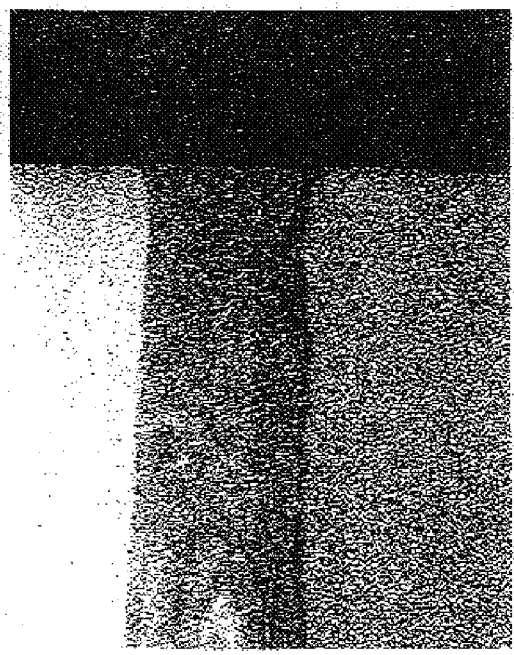
FIG. 7 shows another example of a supply stock with the welding bead removed by cutting and is shown in enlargement of 110:1.

In FIGS. 6 and 7, weld bonds of a supply stock are depicted made using the process according to the invention. Differences in the appearance of the material in the microsection are caused by different etchings and/or etching processes. The lack of longitudinal grooves in the supply stock is clearly discernible.

Experiments have shown that saw blades and saw belts made from supply stock according to the invention have a considerably lower rate of failure caused by tooth fractures. Furthermore, it was shown that improved welding processes resulting in larger bulges and/or welding beads can be used as well because the bulges are ultimately cut off.

What is claimed is:

1. A process for producing supply stock for a saw member that comprises at least a carrier part made of one material and at least a blade part made from a different material, the process comprising:
   welding the carrier part to the blade part to form the supply stock having a thickness defined by a first and a second surface;
   forming a welding bead in an area where the carrier part is welded to the blade part, the welding bead having a projecting portion which projects beyond at least one of the first and the second surface; and
   removing material from the projecting portion and from at least a portion of at least one of the first and the second surface.

2. The process of claim 1, wherein the removing reduces the thickness of at least a portion of the supply stock and removes material from the projecting portion.

3. The process of claim 1, wherein the saw member comprises one of a saw blade and a saw belt.

4. The process of claim 1, wherein the forming comprises producing the welding bead so that a portion projects beyond each of the first and the second surface.

5. The process of claim 4, wherein the removing comprises removing material from at least a portion of each of the first and the second surface.

6. The process of claim 1, wherein the removing comprises removing material from at least a portion of each of the first and the second surface.

7. The process of claim 1, wherein the removing comprises removing material from each of the first and the second surface of the supply stock.

8. The process of claim 1, wherein the removing comprises grinding.

9. A process for producing supply stock for a saw member that comprises at least a carrier part made of one material and at least a blade part made from a different material, the process comprising:
   welding the carrier part to the blade part to form the supply stock having a thickness defined by a first and a second surface;
   forming a welding bead in an area where the carrier part is welded to the blade part, the welding bead having a projecting portion which projects beyond at least one of the first and the second surface; and
   removing material from at least a portion of at least one of the first and the second surface,
   wherein the removing comprises grinding and polishing.

10. The process of claim 1, wherein the removing comprises removing material in a direction which is not parallel to a direction of the welding bead.

11. The process of claim 10, wherein the removing comprises removing material in a direction which is at least one of diagonal and perpendicular to the direction of the welding bead.

12. A supply stock for a saw member comprising:
    at least a carrier part made of one material;
    at least a blade part made from a different material;
    the carrier part being connected to the blade part by welding to form the supply stock;
    the supply stock having a thickness defined by a first and a second surface; and
    a welding bead being located in an area where the carrier part is welded to the blade part, the welding bead having a projecting portion which projects beyond at least one of the first and the second surface,
    wherein at least one of the first surface and the second surface comprises a surface which has been subjected to material removal by cutting, and
    wherein the projecting portion comprises another surface which has been subjected to material removal by cutting.

13. The stock of claim 12, wherein the thickness of the supply stock is less than a thickness of at least one of the carrier part and the blade part.

14. The stock of claim 12, wherein the saw member comprises one of a saw blade and a saw belt.

15. The stock of claim 12, wherein the welding bead comprises projecting portions which project beyond each of the first and the second surface.

16. The stock of claim 15, wherein each of the first surface, the second surface, and the projecting portions comprise a surface which has been subjected to material removal by cutting.

17. The stock of claim 12, wherein each of the first surface and the second surface comprise a grooveless flat surface which has been subjected to material removal by cutting.

18. A process for producing supply stock for a saw member that comprises at least a carrier part made of one material and at least a blade part made from a different material, the process comprising:
    welding the carrier part to the blade part to form the supply stock having a thickness defined by a first and a second surface;

forming a welding bead in an area where the carrier part is welded to the blade part, the welding bead having a first projecting portion which projects beyond the first surface and a second projecting portion which projects beyond the second surface; and removing material from at least one of:
the first projecting portion and the first surface, and
the second projecting portion and the second surface, wherein the removing occurs after the forming, and wherein the removing reduces the thickness of the supply stock.

19. The process of claim 18, wherein the saw member comprises one of a saw blade and a saw belt.

20. The process of claim 18, wherein the removing comprises removing material from each the first and the second surface.

21. A process for producing supply stock for a saw member that comprises at least a carrier part made of one material and at least a blade part made from a different material, the process comprising:

welding the carrier part to the blade part to form the supply stock having a thickness defined by a first and a second surface;

forming a welding bead in an area where the carrier part is welded to the blade part, the welding bead having a first projecting portion which projects beyond the first surface and a second projecting portion which projects beyond the second surface; and removing material from at least one of:
the first projecting portion and the first surface, and
the second projecting portion and the second surface, wherein the removing reduces the thickness of the supply stock, and wherein the removing comprises one of grinding and grinding and polishing.

22. The process of claim 18, wherein the removing comprises removing material in a direction which is not parallel to a direction of the welding bead.

23. The process of claim 18, wherein the removing comprises removing material in a direction which is at least one of diagonal and perpendicular to the direction of the welding bead.

24. A supply stock for a saw member that comprises at least a carrier part made of one material and at least a blade part made from a different material, the supply stock made by a process comprising:

welding the carrier part to the blade part to form the supply stock having a thickness defined by a first and a second surface;

forming a welding bead in an area where the carrier part is welded to the blade part, the welding bead having a first projecting portion which projects beyond the first surface and a second projecting portion which projects beyond the second surface; and removing material from at least one of:
the first projecting portion and the first surface, and
the second projecting portion and the second surface, wherein the removing reduces the thickness of the supply stock, and wherein the removing occurs after the welding and forming.

25. The process of claim 1, wherein the first and second surfaces are parallel to one another following the removing.

26. The supply stock of claim 12, wherein the first and second surfaces are parallel to one another following the removing.

27. The process of claim 18, wherein the first and second surfaces are parallel to one another following the removing.

28. The supply stock of claim 24, wherein the first and second surfaces are parallel to one another following the removing.

* * * * *